United States Patent
Barre et al.

(10) Patent No.: US 8,104,818 B2
(45) Date of Patent: Jan. 31, 2012

(54) DASHBOARD SEAL

(75) Inventors: Philippe Barre, Joinville le Pont (FR); Jacques Matusik, Montigny le Bretonneux (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 25 days.

(21) Appl. No.: 12/663,270

(22) PCT Filed: May 27, 2008

(86) PCT No.: PCT/FR2008/050913
§ 371 (c)(1),
(2), (4) Date: Dec. 15, 2009

(87) PCT Pub. No.: WO2008/152293
PCT Pub. Date: Dec. 18, 2008

(65) Prior Publication Data
US 2010/0133876 A1    Jun. 3, 2010

(30) Foreign Application Priority Data
Jun. 4, 2007 (FR) ..................... 07 55435

(51) Int. Cl.
*B62D 25/14*   (2006.01)

(52) U.S. Cl. ....... 296/70; 296/84.1; 49/490.1; 49/496.1; 49/498.1

(58) Field of Classification Search ............ 296/70, 296/84.1, 96.21, 192; 49/496.1, 498.1, 490.1
See application file for complete search history.

(56) References Cited

U.S. PATENT DOCUMENTS

| | | | | |
|---|---|---|---|---|
| 2,622,286 | A | * | 12/1952 | Beck .......................... 49/496.1 |
| 3,179,987 | A | * | 4/1965 | Banzet ........................ 49/489.1 |
| 5,466,508 | A | | 11/1995 | Brocke et al. |
| 5,634,644 | A | | 6/1997 | Guillon |
| 2002/0152686 | A1 | | 10/2002 | Whitehead |
| 2002/0152687 | A1 | | 10/2002 | Willett |
| 2007/0029130 | A1 | | 2/2007 | Albu et al. |

FOREIGN PATENT DOCUMENTS

| | | |
|---|---|---|
| DE | 3909389 A1 | 9/1990 |
| DE | 19705683 A1 | 8/1998 |
| DE | 10035958 A1 | 2/2002 |
| EP | 0615875 A | 9/1994 |
| FR | 2872098 A | 12/2005 |
| JP | 20010151035 A | 6/2001 |

OTHER PUBLICATIONS

Graf Dichtungen, "Restauriermaterial fuer Oldtimer," Jan. 1, 2007, Graf Dichtungen, Fidicinstr 6, 10965 Berlin, Germany, pp. 1-6.
International Search Report of PCT Appl. No. PCT/FR2008/050913 mailed Dec. 3, 2008.

* cited by examiner

*Primary Examiner* — Dennis Pedder
(74) *Attorney, Agent, or Firm* — Nicolas E. Seckel

(57) ABSTRACT

The invention relates to a dashboard seal provided between the windshield (1), the sound-proofing wall (2) of the engine compartment and the dashboard (3) in the passenger compartment of the vehicle. The dashboard seal is characterized in that the upper lip (6) includes a closed pocket (8) extending along a transverse section under the latter and limited by said upper lip (6), by the clamp (5) and, at the lower portion thereof, by a connection arm (8a) connected both to the upper lip (6) and to the clamp (5).

10 Claims, 3 Drawing Sheets

Figure 3:
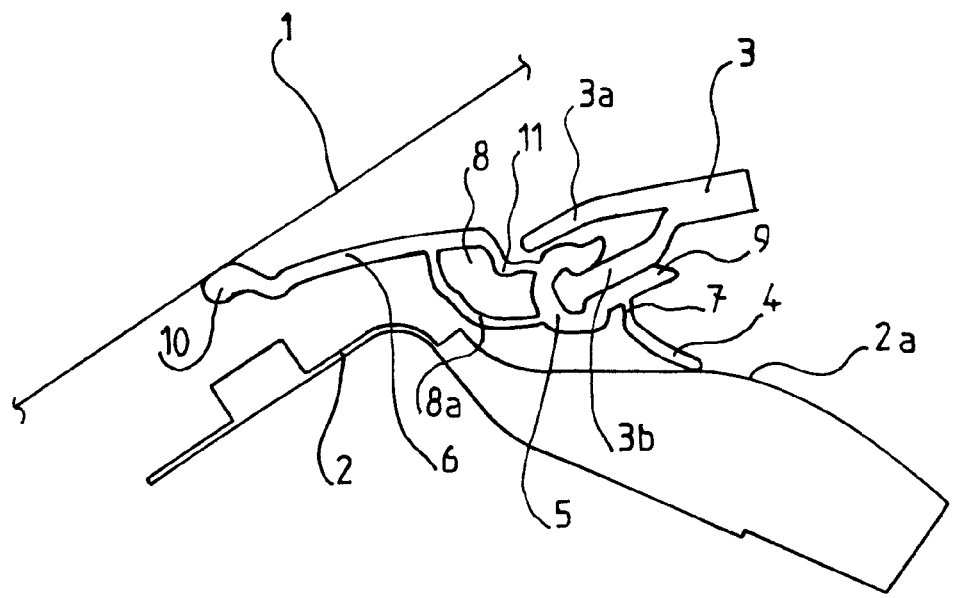

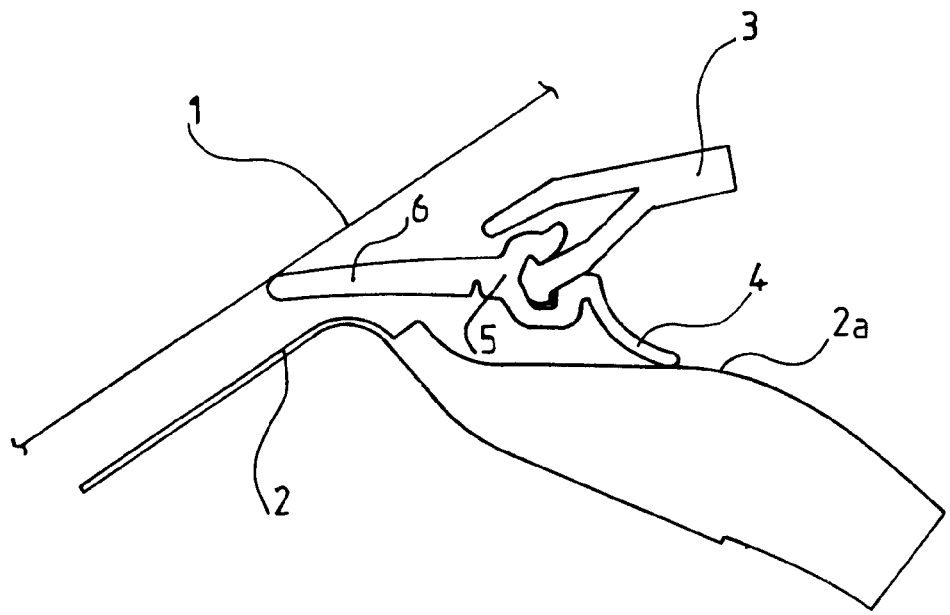
_Fig. 1_
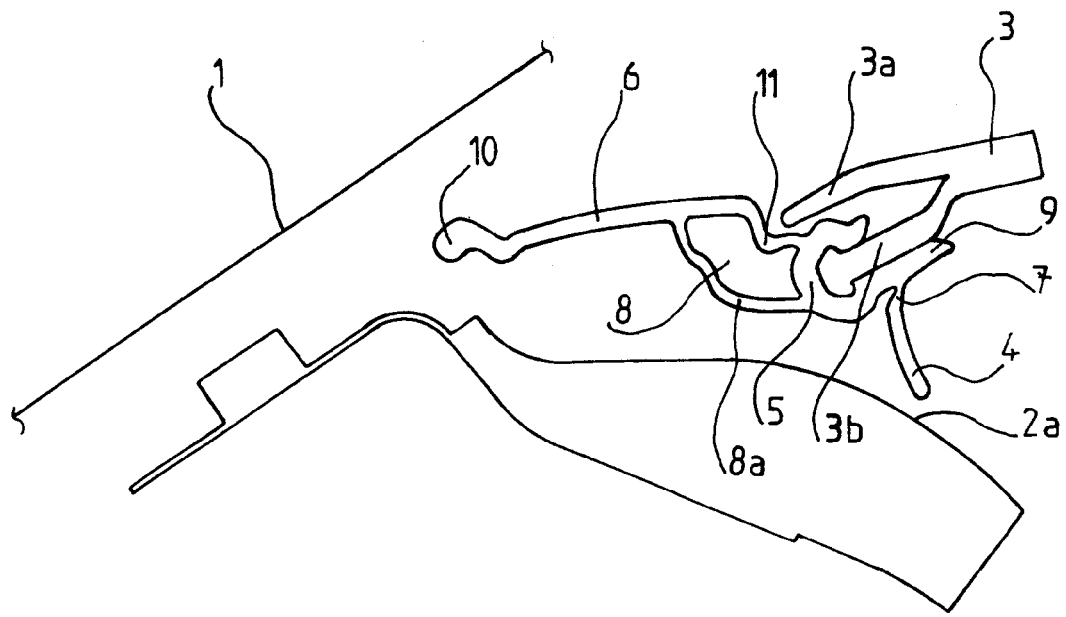
_Fig. 2_

DASHBOARD SEAL

The present invention relates to a dashboard seal for a motor vehicle. More precisely, the invention relates to a seal that has a good visual appearance and provides acoustic insulation between the dashboard, the windshield and the soundproofing panel of the engine compartment.

FIG. 1 of the present application shows a cross-section of a dashboard seal according to the state of the art. Such a dashboard seal is known from document FR-A-2872098, which can be consulted for further information.

In the passenger compartment of a vehicle, a dashboard seal is provided between a windshield 1 separating the passenger compartment from the outside and a soundproofing panel 2 separating the passenger compartment from the vehicle engine compartment. In addition, this seal is held in place by an edge of the dashboard 3 known as the front edge of the dashboard. The seal, the windshield 1, the panel 2 and the dashboard 3 extend substantially along the lateral direction of the vehicle.

This seal comprises a clamp 5 to which an upper lip 6 and a lower lip 4 are connected. The clamp 5 has a C shape and comprises an upper jaw and a lower jaw with a recess between them accommodating the front edge of the dashboard 3, embodied here in the form of an extremity of the lower arm of a forked edge rimming the dashboard 3.

The upper lip 6 extends from the clamp 5 to the windshield 1, where its free end can make contact with the lower edge thereof. From the pressure exerted by the windshield 1 on the edge of the upper lip 6, the latter bends slightly to form a continuous, airtight contact along the lateral direction of the vehicle.

The lower lip 4 extends downward from the free end of the lower jaw of the clamp 5. When the seal is fitted in the vehicle passenger compartment, this lower lip 4 makes contact via its free lower edge with a part 2a of the panel 2. From the pressure exerted by the panel 2 on the free end of the lower lip 4, the latter bends slightly to take on a substantially curved shape and form a continuous contact along the lateral direction of the vehicle with the part 2a of the panel 2.

This solution applying a double-lipped seal to the front edge of the dashboard in order to form the acoustic seal and the trim between the windshield and the dashboard is not entirely satisfactory, however. Depending on the divergences between these latter two parts and the assembly process—whether the order of the assembly steps puts the windshield installation first and then the dashboard installation or the reverse—the following problems crop up:

the seal does not adhere to the windshield, which produces an acoustic leak, the seal buckles under the dashboard and no longer touches the windshield, which then requires palliative action entailing extra assembly costs and a quality risk, the seal presses too hard on the windshield and detaches it partially, the seal buckles half in one direction and half in the other, creating a visual and acoustic flaw.

Thus, a new type of seal must be developed for each vehicle plan, which solves the aforementioned problems only partially. For example, in one case, provision is made to add a foam seal onto the windshield so as to ensure contact between the upper lip and the foam seal. One can also pull on the seal if it buckles during assembly onto the soundproofing panel, so as to put it back in the right position. The above-mentioned problems are not eliminated, however; they are only attenuated.

Moreover, the applicant has observed, by digital simulation tests in particular, that the lower lip also plays a role in creating these flaws. That is, poor positioning of the lower lip on the panel can cause the lower jaw of the clamp to pivot, consequently lowering the upper lip, which at that point no longer adheres to the windshield in response to these divergences.

The problem underlying the present invention is to ensure a placement of the seal between the windshield, the soundproofing panel of the engine compartment and the dashboard that provides good acoustic insulation as well as a good visual appearance, with this placement maintained in all of the operating conditions of the vehicle.

To this end, an object of the invention is a dashboard seal disposed between the windshield, the soundproofing panel of the engine compartment, and the dashboard in the passenger compartment of a vehicle, this seal extending substantially along the lateral direction of the vehicle and comprising a clamp with an upper jaw and a lower jaw forming a cavity between them to accommodate an edge of the dashboard, an upper lip extending cross-sectionally between one of its ends connected to said clamp and its other, free end, which is fitted against the lower edge of the windshield in the installed position of the seal, and a lower lip extending cross-sectionally between one of its ends connected to said clamp and its other, free end, which is fitted against the panel in the installed position of the seal, said dashboard seal being characterized in that the upper lip has a closed pocket extending cross-sectionally thereunder, bounded by said upper lip, by the clamp, and at its lower part by a connecting arm attached firstly to the upper lip and secondly to the clamp.

Advantageously, the lower jaw of the clamp comprises a bearing surface at its free end for the edge of the dashboard inserted into the clamp cavity.

Advantageously, the lower lip has a reduction in thickness on its upper part connected to the clamp.

Advantageously, the upper lip and the clamp are made of rigid plastic material, e.g., polypropylene, and the lower lip is made of a thermoplastic elastomer material, e.g., ethylene-propylene-diene monomer.

Advantageously, the reduction in the thickness of the lower lip is at the connection of this lower lip with the clamp. Preferably, the lower lip is connected with the clamp by the lower jaw thereof, e.g., where the bearing surface begins on this lower jaw.

Advantageously, the top side of the upper lip comprises a groove designed to accommodate an element in certain operating conditions that serves as a stop and thereby holds part of the upper lip in contact with the windshield.

The invention also relates to a vehicle comprising an inside passenger compartment with a dashboard, a windshield, and a panel extending between an engine compartment and the vehicle passenger compartment, characterized in that it comprises such a dashboard seal.

The edge of the dashboard facing the clamp can be fork-shaped with an upper, free arm and a lower arm supported on the bearing surface of the lower jaw of the clamp, the end of this lower arm being seated in the clamp between the upper and lower jaws. In the installed position of the seal and in certain operating conditions, the upper arm of the fork of the dashboard can come to bear on a place, preferably groove-shaped, on the top side of the upper lip, substantially above the middle of the closed pocket.

Figure 4:
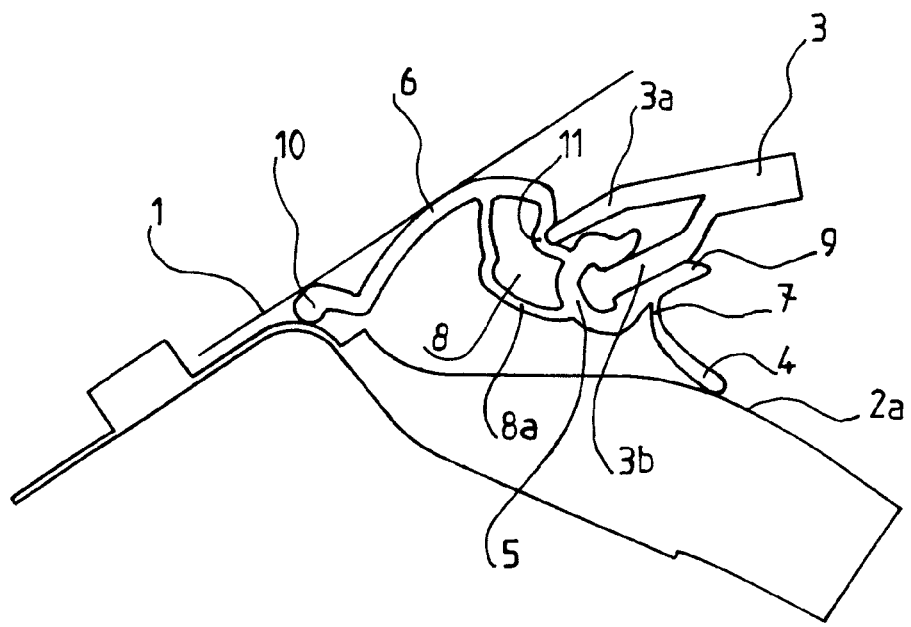
Figure 5:
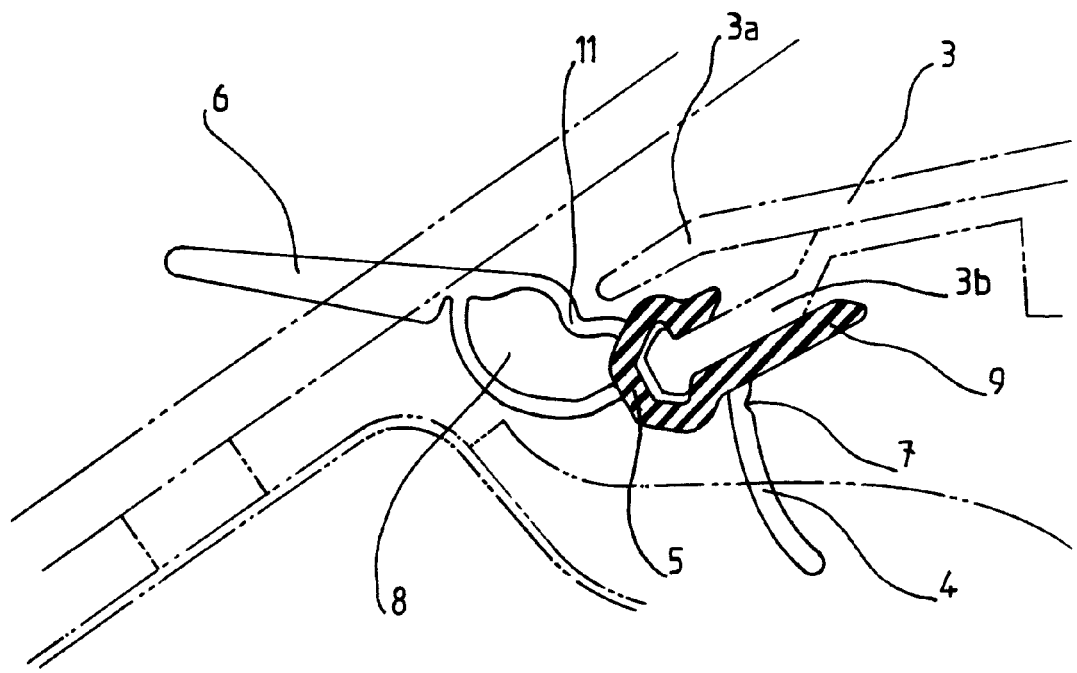

The invention will now be described in greater detail, but not exhaustively, with reference to the annexed figures, in which:

FIG. 1 is a cross-section of the dashboard seal according to the state of the art, FIG. 2 is a cross-section of the dashboard seal in a first embodiment according to the present invention, before it is installed between the panel and the windshield, FIG. 3 is a cross-section of the dashboard seal in a first embodiment according to the present invention, showing the position of the seal in the case of maximum divergence between dashboard and windshield, FIG. 4 is a cross-section of the dashboard seal in a first embodiment according to the present invention, showing the position of the seal in the case of minimum divergence between dashboard and windshield, FIG. 5 is a cross-section of the dashboard seal in a second embodiment according to the present invention.

FIG. 1 has already been described in the introductory part of the description of the present application.

FIGS. 2, 3 and 4 show a cross-section of the dashboard seal with the characteristics of the present invention in various operating conditions.

The seal according to the present invention comprises a bearing surface 9 at the free end of the lower jaw of the clamp 5 for the edge of the dashboard 3 inserted into the clamp 5 cavity. In this figure, the edge of the dashboard 3 in question is in the shape of an arm 3b comprising a bulge at its free end, this bulge fitting inside the cavity of the clamp 5 along with a smaller part of the rest of the arm 3b of the dashboard 3.

Referring to FIG. 1 where there is very little contact surface, the risk of rotating the seal with respect to the dashboard is high. With the bearing surface 9 according to the present invention, which extends cross-sectionally substantially parallel to the axis of the arm 3b, and which is in contact with the arm 3b over a large part of its length, there is better contact between the clamp 5 and the arm 3b of the dashboard 3, and consequently, increased continuity between the seal and the dashboard 3. In FIGS. 2 to 4, the clamp 5 thus retains a C shape in cross-section, with an elongated base formed by the bearing surface 9.

Next, the seal according to the present invention comprises a lower lip 4 with a reduction in thickness 7 on its upper part connected to the clamp 5. With the arrangement according to FIG. 1, when the lower lip 4 pressed on the corresponding part of the panel 2a, a force was exerted on the clamp 5 due to the relative rigidity of the lower lip 4.

As seen more readily in FIGS. 3 and 4, when the seal is installed between the panel 2 and the windshield 1, the lower lip 4 makes contact with the corresponding part 2a of the panel and can no longer go with the seal as it moves forward toward the windshield 1; it follows that depending on the rigidity of the lower lip 4, a force of some magnitude can be exerted on the clamp 5, which tends to open this clamp 5.

With such a reduction in thickness 7, the lower lip 4 has greater elasticity relative to the clamp 5, and the forces being exerted on the free end of the lower lip 4 in contact with the corresponding part of the panel 2a are no longer transmitted directly to the clamp 5, resulting in a lesser risk of deformation thereof, particularly of the lower end of its cavity accommodating the edge of the dashboard, which had a tendency to open when subjected to forces of this kind.

The lower lip 4 is preferably connected to the clamp 5 at its lower jaw, advantageously at the bearing surface 9, and closer to the end of this bearing surface 9 that is connected to the lower jaw 4 than to the free end of this bearing surface 9, so as to not exert any force distancing this bearing surface 9 from the arm 3b of the dashboard 3.

The seal according to the invention additionally has a pocket 8 that is closed and extends cross-sectionally underneath the upper lip 6, this pocket being bounded on one side by said upper lip 6 and on the other by the clamp 5. This closed pocket 8 creates an absorption zone for the divergence forces exerted on the seal. A connecting arm 8a is attached onto the clamp 5 on one side and onto the lower part of the upper lip 6 on the other, this connecting arm 8a extending underneath the upper lip 6. This connecting arm 8a can thus supplement a lower part of the upper lip 6, as well as an outer part of the C of the clamp 5 to form the periphery of the pocket 8. This pocket 8 can also cooperate with a specific shape of the dashboard 3, as will be seen below.

As for the composition of the various elements of the dashboard seal, the upper lip 6 and the clamp 5 are advantageously made of rigid plastic material, e.g., polypropylene, as they do not need to be made of flexible material; on the contrary, they require a resistant material. By contrast, the lower lip 4 is preferably made of a thermoplastic elastomer material, e.g., ethylene-propylene-diene monomer (EPDM).

In a first example, the clamp and the bearing surface can be made of EPDM of Shore 90 A hardness and the lips and walls of the pocket 8 of EPDM of Shore 90 A hardness.

In a second example, the clamp and the bearing surface can be made of polypropylene, and the lips and the walls of the pocket of a polypropylene/EPDM blend.

An embodiment of a seal cooperating with a specific dashboard is also shown in FIGS. 2 to 4.

In these figures, the dashboard 3 has a fork-shaped edge that bends toward the seal. The lower arm 3b of this fork of the dashboard is in contact with the bearing element 9 of the lower jaw and fits inside the clamp with its end that has a rounded shape. As for the upper arm 3a, it extends above the clamp 5, and in the case where the upper lip 6 is pushed back due to contact with the windshield 1 and the panel 2, particularly in the case of minimal divergence between the dashboard 3 and the windshield 1 as shown in FIG. 4, it can come into contact with the top side of the upper lip 6. In this case, it can serve as a stop for part of this top side of the upper lip 6 and partially bring this upper lip 6 to press against the windshield 1. The supporting arm 8a then performs its function along with the pocket 8, by bending the pocket so as to push part of the upper lip 6 against the windshield 1. Advantageously, the top side of the upper lip 6 can have a recess 11 at the place where the edge of the upper arm 3a of the fork of the dashboard 3 is intended to make contact.

FIG. 5 shows a cross-section of the dashboard seal in a second embodiment according to the present invention. This seal differs essentially from the seal according to the first embodiment of the invention by having a thicker upper lip 6, whose thickness decreases evenly to its free end, and a longer bearing surface 9 for the arm 3b of the fork. In addition, the clamp 5 has an inside profile that allows some play for the bulge on the end of the arm 3b of the dashboard 3. This bulge can have more of a polygon structure or a less rounded shape than in the first embodiment. In addition, the reduction in thickness 7 is less pronounced than in the first embodiment, and may consist of a simple notch made in the upper part of one side of the lower lip 4, preferably on the side of this lip facing away from the panel 2a.

This embodiment is considered to be a preferred embodiment of the invention.

Thus, it can be seen that the invention also relates to cooperation between a dashboard seal and the dashboard itself, and that this cooperation is not restricted just to a seal, but also applies to a vehicle having such a seal in association with a dashboard and its specific characteristics, as well as a panel and a windshield, among other things.

The advantages to be had with such a dashboard seal are numerous. Among other things, we can mention an airtight seal between the dashboard and the windshield, less acoustic leakage, particularly from the engine through the soundproofing panel, the possibility of dispensing with an additional foam seal on the windshield between the upper lip of the seal and the windshield, the possibility of not having to use material prior to installing the seal, and lastly, the possibility of no longer taking corrective action to position the seal after installation, as in applying a straight edge on the assembly line to correct local buckling of the seal. This represents a substantial manufacturing advantage.

In addition to the well-known acoustic advantage and the visual advantage for the quality of the seal, such a seal can be suitable for various types of vehicles without needing any specific adaptation. There is also the possibility that one can easily replace pre-existing dashboard seals on existing vehicles with seals according to the present invention.

The invention claimed is:

1. Vehicle comprising an inside passenger compartment, a dashboard, a windshield, a panel extending between an engine compartment and the vehicle passenger compartment, and a dashboard seal disposed between the windshield, the soundproofing panel of the engine compartment, and the dashboard in the passenger compartment of a vehicle, this seal extending substantially along the lateral direction of the vehicle, said dashboard seal comprising:
   a clamp with an upper jaw and a lower jaw forming a cavity between them that accommodates an edge of the dashboard,
   an upper lip extending cross-sectionally between one of its ends connected to said clamp and its other, free end, which is fitted against the lower edge of the windshield, and
   a lower lip extending cross-sectionally between one of its ends connected to said clamp and its other, free end, which presses against the panel,
   wherein the upper lip has a closed pocket extending cross-sectionally thereunder, bounded by said upper lip, by the clamp, and at its lower part by a connecting arm attached firstly to the upper lip and secondly to the clamp,
   wherein a free end of the lower jaw of the clamp extends beyond a free end of the upper jaw along the main axis of the cavity, so that the lower jaw of the clamp comprises a bearing surface at its free end for the edge of the dashboard inserted into the clamp cavity, and
   wherein the edge of the dashboard facing the clamp is fork-shaped with an upper, free arm and a lower arm supported on the bearing surface of the clamp, the end of this lower arm being seated in the clamp between the upper and lower jaws.

2. Vehicle according to claim 1, wherein, in the installed position of the seal and in certain operating conditions, the upper arm of the fork of the dashboard comes to bear on a part on the top side of the upper lip, substantially above the middle of the closed pocket.

3. Vehicle according to claim 2, wherein the part on which the upper arm of the fork of the dashboard comes to bear is groove shaped.

4. Vehicle according to claim 1, wherein the lower lip of the seal has a reduction in thickness on its upper part connected to the clamp.

5. Vehicle according to claim 1, wherein the upper lip and the clamp of the seal are made of rigid plastic material, and the lower lip of the seal is made of a thermoplastic elastomer material.

6. Vehicle according to claim 4, wherein the reduction in the thickness of the lower lip of the seal is at the connection of this lower lip with the clamp.

7. Vehicle according to claim 6, wherein the lower lip of the seal is connected with the lower jaw of the clamp.

8. Vehicle according to claim 1, wherein the top side of the upper lip of the seal comprises a groove designed to accommodate, in certain operating conditions, the upper arm of the dashboard that serves as a stop and thereby holds part of the upper lip in contact with the windshield.

9. Vehicle according to claim 5, wherein the upper lip and the clamp of the seal are made of polypropylene, and the lower lip of the seal is made of ethylene-propylene-diene monomer.

10. Vehicle according to claim 7, wherein the lower lip of the seal is connected with the lower jaw of the clamp at a location where the lower jaw begins to extend beyond the free end of the upper jaw along the main axis of the cavity.

* * * * *